United States Patent
Heese

(10) Patent No.: US 6,392,379 B2
(45) Date of Patent: May 21, 2002

(54) METHOD OF CONTROLLING A FREQUENCY CONVERTER OF A RELUCTANCE MACHINE

(75) Inventor: Thomas Heese, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/761,003

(22) Filed: Jan. 16, 2001

(30) Foreign Application Priority Data

Jan. 22, 2000 (DE) .......................................... 100 02 706

(51) Int. Cl.⁷ ................................................ H02P 1/46
(52) U.S. Cl. ....................... 318/701; 318/254; 318/439; 318/138
(58) Field of Search ............................... 318/701, 254, 318/439, 138

(56) References Cited

U.S. PATENT DOCUMENTS

| | | | | |
|---|---|---|---|---|
| 4,933,621 A | * | 6/1990 | MacMinn et al. | 318/696 |
| 5,296,787 A | * | 3/1994 | Albrecht et al. | 318/433 |
| 5,861,727 A | * | 1/1999 | Blackburn et al. | 318/701 |
| 5,998,945 A | * | 12/1999 | Elliott | 318/254 |
| 6,137,248 A | * | 10/2000 | Kalpathi | 318/254 |

FOREIGN PATENT DOCUMENTS

EP  0 848 491 A2  6/1998

OTHER PUBLICATIONS

Miller: "Switched Reluctance Motors and Their Control", Magna Physics Publishing and Clarendon Press, Oxford, 1993, Kapitel 4, Dynamic Operation, pp. 53–61.

\* cited by examiner

Primary Examiner—Robert E. Nappi
Assistant Examiner—Rina I. Duda
(74) Attorney, Agent, or Firm—Michael J. Striker

(57) ABSTRACT

The method of controlling a converter of a switched reluctance machine includes clocking a power switch with a frequency that depends on the width of the hysteresis band. The hysteresis width is varied according to reluctance machine speed, especially so that a difference between maximum and minimum values with which the current is switched on and off either increases with decreasing speed, decreases with increasing load, or both. The changing of the hysteresis width occurs so that a difference between maximum and minimum threshold values either increases with decreasing speed, decreases with increasing load, or both. The width of the hysteresis band preferably varies linearly with speed, load and/or current, especially so that the width of the hysteresis band varies linearly so that the clocking frequency is maintained substantially constant. Also targeted changes in the width of the hysteresis band are made to move the clocking frequency from near noise-critical resonance frequencies.

11 Claims, 1 Drawing Sheet

METHOD OF CONTROLLING A FREQUENCY CONVERTER OF A RELUCTANCE MACHINE

BACKGROUND OF THE INVENTION

1. Field of the Invention

The present invention relates to a method of controlling a frequency converter of a switched reluctance machine, which includes current regulation with hysteresis, with which the current switch is clocked with a frequency, which depends on the width of a hysteresis band.

2. Prior Art

Different methods for controlling a frequency converter for a switched reluctance motor are described in Chapter 4, Dynamic Operation, on pp. 53 to 61 of the book "Switched Reluctance Motors and Their Control" by T. J. E. Miller, MAGNA PHYSICS PUBLISHING AND CLARENDON PRESS, OXFORD, 1993. A frequency converter circuit, which provides a switch for the current supply, a commutator switch and two free-running diodes associated with these switches for each phase of the machine, is usually used. The switches usually comprise transistors. One such switch is shown, e.g. in FIG. 4.1 on page 53 of the above-mentioned reference. These switches can be operated in both a hard and also soft interruption mode. In the hard interruption mode both the current switch and the commutator switch of a phase are clocked on and off simultaneously during its current conducting phase. In the soft interruption mode only the current switch is clocked on and off during the current conducting phase while the commutator switch of this phase is turned on during the entire current conducting phase. This soft interruption mode (soft chopping) is preferred for motor operation of a switched reluctance machine, because it causes less noise and electromagnetic interference. The current is thus controlled during the hysteresis-current control described on page 62 of the above-mentioned reference so that it should remain at a given value in a stage between a maximum and a minimum value, at which the provided current switch is clocked on and off accordingly. The clock frequency, with which the supplied current is switched on and off, decreases with increasing inductivity and increasing flux interlinking in the associated phase. The clock frequency is also variable according to the predetermined hysteresis band. This leads to unpleasant and in some cases harmful noise problems.

EP 0 848 491 A2 describes a process and circuit arrangement for operating a switched reluctance motor, in which a hysteresis-current regulation with adjustable hysteresis band is provided. The current switch is clocked. The clocking is kept constant and the width of the hysteresis band is pre-determined and changed so that the clock frequency is maintained constant during each occurring current load and current demand. Also the clock frequency is monitored and a frequency error signal is generated, which acts to change the width of the hysteresis band, so that the clock frequency is maintained substantially constant. Noise problems can be largely reduced by this system, since no low frequencies occur. However the clock frequency must generally be measured, which is difficult in practice and is expensive. Furthermore this system is constructed as a true regulating system with the frequency as a feedback signal. However because of the constant clock frequency noise problems occasionally occur.

SUMMARY OF THE INVENTION

It is an object of the present invention to provide a simpler and more economical method of controlling a frequency converter circuit of a switched reluctance machine, which also operates according to another principle than the current prior art methods.

It is another object of the present invention to provide a simple and economical method of controlling a frequency converter circuit of a switched reluctance machine, which avoids disadvantageous noise problems.

These objects and others, which will be made more apparent hereinafter, are attained in a method of controlling a frequency converter of a switched reluctance machine, which includes current regulation with hysteresis, and in which a power switch is clocked with a frequency, which depends on the width of the hysteresis band.

According to the invention the width of the hysteresis band is varied according to the rotational speed of the reluctance machine, particularly so that a difference between maximum and minimum threshold values with which the current for the reluctance machine is switched on and off either increases with decreasing rotational speed, decreases with increasing load, or both.

The method of controlling a frequency converter of a switched reluctance machine according to the invention has the advantage that a substantially simpler indirect control of the width of the hysteresis band is provided. The width of the hysteresis band depends on the following parameters: rotation speed, phase current and rotor position. These parameters are necessary for regulating the drive and are thus already present. Moreover the essential advantage of the method is that no additional signal is required and thus the required work and expenses are reduced.

Additional improvements and advantages are provided by the features of preferred embodiments claimed in the appended dependent claims and described in the following description.

In a particularly advantageous embodiment of the method the width of the hysteresis band is varied linearly with rotational speed, load and/or current of the reluctance motor, especially so that the clocking frequency with which the power switch is clocked is maintained substantially constant.

According to a very advantageous preferred embodiment of the method according to the invention for avoiding noise-critical resonance frequencies the method includes making a targeted change in the width of the hysteresis band in order to change the clocking frequency when the rotational speed of the reluctance machine is at a speed value at which the clocking frequency which is substantially constant is in the vicinity of a noise-critical resonance frequency. In this way the noise-critical resonance frequencies may be avoided in an elegant manner, since the targeted change of the clocking frequency is conducted with a suitable change of the width of the hysteresis.

A special embodiment of the method of the invention includes changing the clocking frequency from a higher or lower constant value to a lower or higher constant value during the targeted change so that the width of the hysteresis band is increased or decreased respectively.

In a particularly preferred embodiment of the method the reluctance machine is operated as a reluctance motor and the power switch comprises transistors.

According to an additional advantageous embodiment of the method of the invention the width of the entire hysteresis band is lowered or raised while maintaining its width by a predetermined amount.

According to an additional embodiment of the method of the invention the width of the hysteresis band is changed, especially periodically, according to a relative position of a rotor of the reluctance machine within a revolution of the rotor.

Before describing the preferred embodiment in the drawing, an introduction will be given first regarding the general control of switched reluctance machines. These machines are usually voltage or current regulated. In voltage regulation the reduction of the average voltage over the phase occurs by clocking transistors, which are used as power switches. This clocking occurs with a fixed frequency and variable on/off ratio.

In current regulation the phase current is controlled between two fixed values. The transistor used as the power switch is switched off when the upper threshold is exceeded and switched on which the current falls below the lower threshold. In this way the phase current can be made constant within a hysteresis band, whose bandwidth is given by the difference between both thresholds. The clocking frequency of the power transistors adjusts itself variably according to the speed, the rotor position and the width of the hysteresis band as well as the absolute height of the threshold values. Up to the present usually the width of the hysteresis band is kept constant. However in the method described in EP 0 848 491 mentioned above the clocking frequency is kept constant, while the width of the hysteresis band changes accordingly.

The problem is that the components and the circuit losses limit the maximum possible clocking frequency. Because of this fact the width of the hysteresis band for the current regulation is adjusted so that the maximum clocking frequency is not exceeded for slower motor speeds, when the reluctance machine is operated as a motor. When the width of the hysteresis band is kept constant over the entire speed range, then the clocking frequency for higher speeds strongly decreases. Because of that it is even possible that the clocking frequency drops until it is in an audible range. The variable clocking frequency can also reach the range of the noise-critical resonance frequencies, so that the noise behavior of the reluctance machine is clearly degraded.

Some help is provided by the method according to the invention since the width of the hysteresis band or bands is changed according to the speed of the reluctance machine. This change takes place so that the spacing between the maximum and minimum threshold values, with which the current is switched on and off, increases with decreasing speed and decreases with increasing load. The width of the hysteresis and/or hysteresis band is determined by the spacing between the maximum and minimum threshold value, with which the current is switched on and off.

According to the invention at a first starting point the width of the hysteresis can be changed linearly with the speed. Instead of that the speed-dependent change can also take place according to the load and/or current. This advantageously happens so that the clock frequency, with which the power switch is clocked, is substantially constant. If this constant clock frequency is in the range of certain noise-critical resonance frequencies in certain applications, such as at a predetermined speed of the controlled reluctance machine, then a special embodiment of the method according to the invention provides a targeted change of the width of the hysteresis band in order to obtain a desired change in the clock frequency. The clock frequency is preferably reduced from a higher constant to a lower constant value, whereby the width of the hysteresis band is increased. Also a further increase is conceivable, as the desired change occurs in the reverse way.

The switched reluctance machine is preferably operated as a reluctance motor and is provided with transistors as power switches. It is also possible to raise or lower the entire hysteresis band a predetermined amount while maintaining its width. Since the inductance changes periodically with rotor position in the switched reluctance machine, the width of the hysteresis band can be changed according to the rotor position in one revolution to maintain the clock frequency constant and of course periodically.

A block diagram of the control according to the method of the invention for the example of rotation speed regulation is shown in FIG. 1. Fundamentally also position and torque regulation are also possible.

BRIEF DESCRIPTION OF THE DRAWING

The objects, features and advantages of the invention will now be illustrated in more detail with the aid of the following description of embodiments, with reference to the accompanying figures in which.

DESCRIPTION OF AN EXEMPLARY EMBODIMENT

Figure 1:
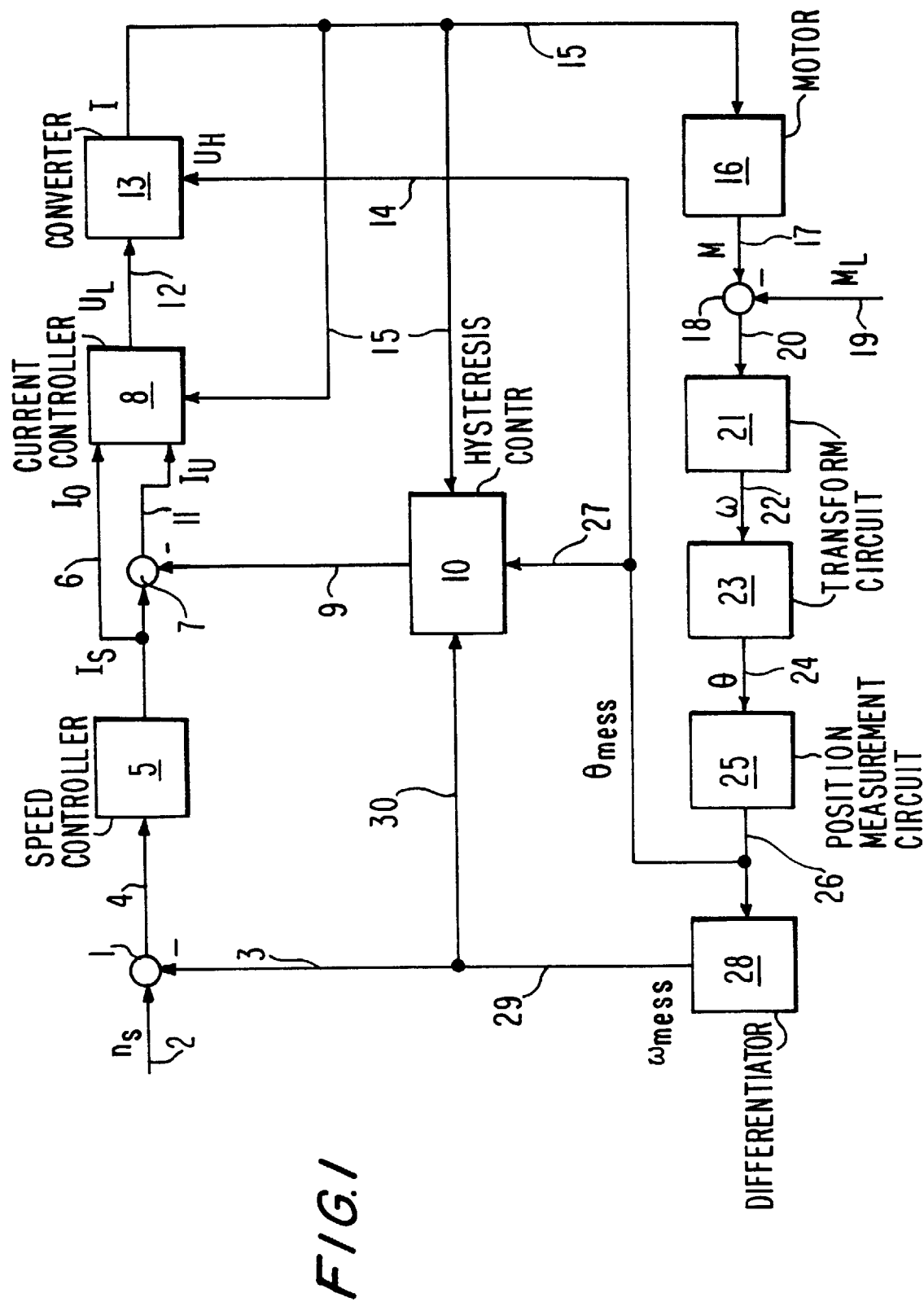
FIG. 1 is a block diagram illustrating the method of controlling a frequency converter of a switched reluctance machine according to the invention for the example of rotation speed regulation.

A set rotation speed $n_s$ is input to a summation point 1 with a positive sign on a line 2 and a measured rotation speed $\omega_{mess}$ is input to the summation point 1 with a negative sign on line 3 for rotation speed regulation. The resulting difference is supplied to a rotation speed controller 5 on a line 4. The rotation speed controller 5 converts this input into a set current value $I_s$, which for example can correspond to the upper current threshold value $I_o$ of the hysteresis band. It is then supplied over the line 6 to both a current controller 8 and a second summation point 7 as the upper current set value $I_0$ and as an input signal for the second summation point 7 respectively. An output signal from the hysteresis controller 10, which represents a current correction value, is fed to the second summation point 7 over the line 9 with the negative sign. A difference signal, which is fed over a line 11 to the current controller 8 as a second input signal $I_U$, is formed by summing the current correction value with its negative sign and the current set value. The current controller 8 produces a voltage $U_L$ as the output signal on the line 12, which is supplied to a converter 13. A voltage $U_H$ is also supplied to the converter 13 on a second input line 14. The output signal of the converter 13 is supplied as current I on the line 15, which is supplied to a switched reluctance machine in the form of a reluctance motor 16. The current signal I on the line 15 is also feedback as an input signal to the current controller 8 and the hysteresis controller 10.

The reluctance motor 16 produces a torque M, which is supplied as an input signal on a line 17 to a third summation point 18. A load torque signal $M_L$ corresponding to the load driven by the motor is supplied to the third summation point 18 with a negative sign over a line 19. The difference signal is supplied over a line 20 to a transform circuit 21. This circuit produces the angular speed ω of the motor 16 with a Laplace transformation according to the formula $1/s(J_L+J_M)$, wherein $J_L$ is the inertial moment of the load and $J_M$ is the inertial moment of the motor. This angular speed ω is supplied over a line 22 to an additional transform circuit 23, which determines the position angle θ with a Laplace transformation according to the formula $1/s$ and supplies it over the line 24 to a position measurement circuit 25. The position measurement circuit 25 supplies the actual measure value of the rotational position of the rotor of the motor 16 as the signal $\theta_{mess}$ over the line 26.

This rotational position signal $\theta_{mess}$ corresponds to the signal $U_H$ on the line 14, which is supplied to the converter 13 as an input signal. By means of this signal the commutation of the phase switch is controlled by the converter, while the supply switch associated with the individual phases is clocked on by means of the signal $U_L$ over the line 12. The signal $\theta_{mess}$ arising on the line 26, which gives the actual measured value of the relative rotation position of the rotor in the motor 16, is supplied over the line 27 as an input signal to the hysteresis controller 10, so that it can change the width of the hysteresis band according to the rotational position of the rotator within a revolution of the rotor, so that the clock frequency is kept as constant as possible at each rotor position.

The rotor position signal $\theta_{mess}$ on the line 26 is the input signal for a differentiating circuit 28. The differentiating circuit 28 supplies the measured angular speed signal $\omega_{mess}$ derived as the time derivative d/dt of the rotational position signal $\theta_{mess}$ on the output line 29. This measured angular speed signal $\omega_{mess}$ is supplied on the line 30 to the hysteresis controller as the actual speed signal from the motor 16 and on the already mentioned line 3 to the first summation point 7 with a negative sign as a comparison value for the set speed value $n_s$ on the line 2.

As seen from FIG. 1, the signals present for the motor parameters required for control of the reluctance motor 16 are the speed signal, in the form of the measured angular speed signal $\omega_{mess}$ on the lines 29, 3 and 30, the phase current, in the form of the signal I on line 15, and the rotor position, in the form of the rotor position signal $\theta_{mess}$ on the lines 26, 14 and 27. The special advantage of the invention is thus that only signals already present are used for the method for indirect control of the width of the hysteresis band, in order to maintain a constant clocking frequency for the converter 13. This process of maintaining the clocking frequency constant can also be continued after a targeted change, for example an increase, of the width of the hysteresis band. Then the clocking frequency, with which the supply current switch is clocked, is reduced from a higher to a lower value. It is also possible to make the reverse of this latter change.

In an advantageous manner the present invention provides an economical process with which the clocking frequency can be maintained substantially constant by changing the width of the hysteresis band and with which clocking frequency can be changed from one constant value to another by targeted changes in the width of the hysteresis band in special noise-critical situations, in order to avoid noise problems.

The disclosure in German Patent Application 100 02 706.7 of Jan. 22, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of controlling a frequency converter of a switched reluctance machine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A method of controlling a frequency converter of a switched reluctance machine, which includes current regulation with hysteresis, said method including the steps of
    a) clocking a power switch with a clocking frequency depending on a width of a hysteresis band; and
    b) changing the width of the hysteresis band according to a rotational speed of the switched reluctance machine.

2. The method as define in claim 1, wherein the changing of the width of the hysteresis band is performed so that a difference between maximum and minimum threshold values with which current for the reluctance machine is turned on and off either increases with decreasing rotational speed, decreases with increasing load or both.

3. The method as defined in claim 2, wherein the width of the hysteresis band varies linearly with at least one of said rotational speed, said load and said current of said reluctance motor.

4. The method as defined in claim 3, wherein the width of the hysteresis band varies linearly with said at least one of said rotational speed, said load and said current so that said clocking frequency with which said power switch is clocked is maintained substantially constant.

5. The method as defined in claim 4, further comprising making a targeted change in the width of the hysteresis band in order to change the clocking frequency when said rotational speed of the reluctance machine is at a speed value at which said clocking frequency which is substantially constant is in the vicinity of a noise-critical resonance frequency.

6. The method as defined in claim 5, wherein said clocking frequency is changed from a higher constant value to a lower constant value during said targeted change so that the width of the hysteresis band is increased or wherein said clocking frequency is changed from another lower constant value to another higher constant value during said targeted change so that the width of the hysteresis band is decreased.

7. The method as defined in claim 1, wherein said reluctance machine is operated as a reluctance motor.

8. The method as defined in claim 1, wherein said power switch comprises transistors.

9. The method as defined in claim 1, further comprising lowering or raising said hysteresis band by a predetermined amount, while maintaining the width of the hysteresis band.

10. The method as defined in claim 1, wherein the width of the hysteresis band is changed according to a relative position of a rotor of the reluctance machine in a revolution of the rotor.

11. The method as defined in claim 10, wherein the width of the hysteresis band is changed periodically according to said relative position of said rotor.

* * * * *